United States Patent [19]
Klingler

[11] 3,739,642
[45] June 19, 1973

[54] OPEN END THERMOMETER
[75] Inventor: Josef F. Klingler, Wilmette, Ill.
[73] Assignee: Thermex, Inc., Chicago, Ill.
[22] Filed: Mar. 5, 1971
[21] Appl. No.: 121,269

[52] U.S. Cl. .................. 73/371, 73/374, 116/114 R
[51] Int. Cl. ........ G01k 5/08, G01k 5/12, G01d 3/00
[58] Field of Search .................... 73/371, 372, 374; 260/613 D; 116/114 Y

[56] References Cited
UNITED STATES PATENTS

| | | | |
|---|---|---|---|
| 3,469,452 | 9/1969 | Ayres | 73/371 |
| 3,218,861 | 11/1965 | Moore et al. | 73/371 |
| 3,487,693 | 1/1970 | Weinstein | 73/371 |
| 2,673,466 | 3/1954 | Mumberg | 73/371 |
| 3,469,451 | 9/1969 | Eizenberg | 73/371 |
| 2,729,977 | 1/1956 | Juffa | 73/371 |

FOREIGN PATENTS OR APPLICATIONS

| | | | |
|---|---|---|---|
| 10,816 | 8/1886 | Great Britain | 73/371 |
| 574,849 | 1/1946 | Great Britain | 73/372 |

OTHER PUBLICATIONS

Publication: "Evolution of the Thermometer". (1592-1743) H. C. Bolton. 1900 QC 271 B69. (pp. 28-33, 60-65 and 80-83).

Primary Examiner—Louis R. Prince
Assistant Examiner—Daniel M. Yasich
Attorney—Hofgren, Wegner, Allen, Stellman & McCord

[57] ABSTRACT

A low cost clinical disposable thermometer formed primarily of molded plastic. The thermometer includes a capillary bore having an open end permitting the indicating liquid to be exposed to ambient pressure while precluding flow of liquid indicator outwardly therethrough under normal ambient conditions. An indicator is provided in association with the thermometer to indicate to the user a condition wherein the thermometer had been subjected to a high temperature causing loss of indicating liquid through the open end of the capillary bore.

26 Claims, 5 Drawing Figures

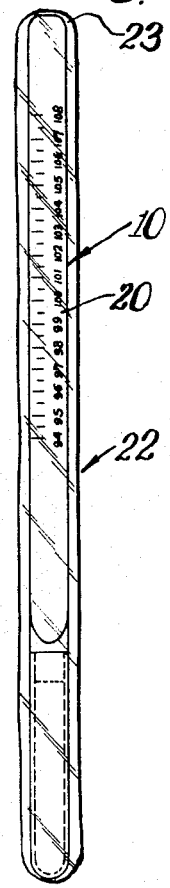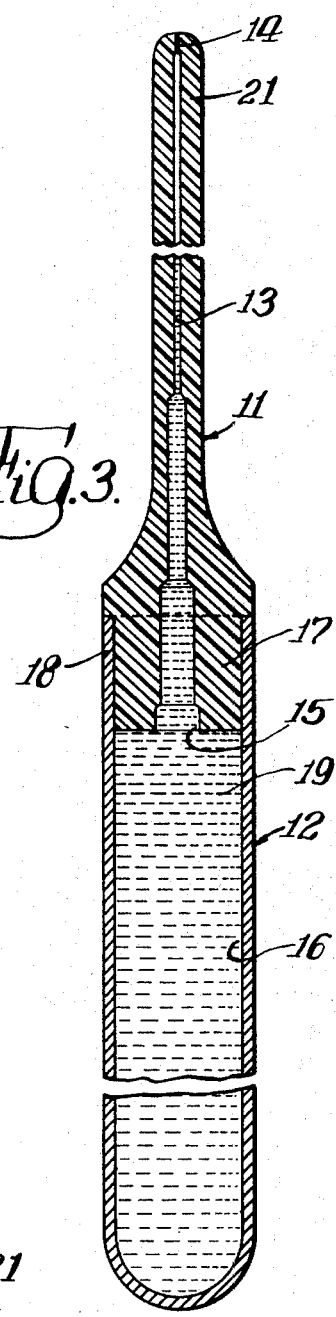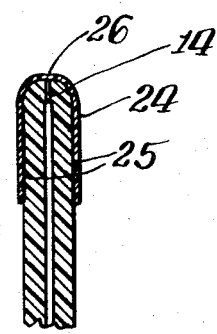

3,739,642

OPEN END THERMOMETER

BACKGROUND OF THE INVENTION

1. Field of the Invention

This invention relates to thermometers and in particular to low cost disposable thermometers.

2. Description of the Prior Art

In my copending application, Ser. No. 872,855, filed Oct. 31, 1969, and now abandoned for a Thermometer, a low cost clinical thermometer is disclosed which is formed of a molded plastic. The thermometer of said application is disclosed as a conventional closed end thermometer wherein the liquid indicator is maintained under a suitable vacuum condition in the capillary tube and reservoir chamber.

SUMMARY OF THE INVENTION

The present invention comprehends an improved low cost disposable thermometer wherein the capillary bore is open at its outer end to maintain the indicator liquid therein at ambient pressure. The outer end of the bore is preselected to have a sufficiently small cross-section to preclude the flow of the indicator liquid outwardly therethrough at normal ambient conditions.

Should the thermometer be subjected inadvertently to extremely high ambient temperature conditions, the indicator liquid may expand sufficiently to have a portion thereof pass outwardly through the open end of the capillary bore. The invention comprehends providing means for indicating the occurrence of such a condition to apprise the user thereof of the decrease in quantity of indicator liquid in the thermometer caused thereby.

The indicating means may comprise a part of the packaging of the thermometer or a separate element associated with the thermomemter at the outer end of the capillary bore, as desired.

The invention further comprehends the use of a one-piece metal bulb defining the reservoir chamber of the thermometer suitably joined to the plastic capillary element. The indicator liquid comprises a substantially nonwettable liquid having low hygroscopicity, low volatility, and low compressibility. The liquid preferably has high stability to gas absorption. An excellent example of a liquid suitable for use in such an open bore thermometer has been found to be the glycol compounds comprising glycol phenyl ethers. Ethylene glycol phenyl ether and propylene glycol phenyl ether have been found to be particularly well suited for such use.

BRIEF DESCRIPTION OF THE DRAWING

Other features and advantages of the invention will be apparent from the following description taken in connection with the accompanying drawing wherein:

FIG. 1 is a front elevation of a packaged thermometer embodying the invention;

FIG. 2 is a side elevation of the thermometer;

FIG. 3 is a fragmentary enlarged vertical section of the thermometer taken substantially along the line 3—3 of FIG. 1;

FIG. 4 is a further enlarged end view of the thermometer; and

FIG. 5 is a fragmentary enlarged cross-section of the outer end of the capillary element with a modified form of liquid-loss indicating means.

DESCRIPTION OF THE PREFERRED EMBODIMENT

In the exemplary embodiment of the invention as disclosed in the drawing, a thermometer generally designated 10 is shown to comprise a low cost disposable thermometer having a capillary element 11 formed of molded plastic and a bulb element 12 formed of metal. Capillary element 11 defines a capillary bore 13 having an open outer end 14 and an open inner end 15. Bulb 12 defines a reservoir chamber 16 and is joined to the inner end 17 of capillary element 11 with reservoir chamber 16 in communication with capillary bore inner end 15. As shown in FIG. 3, the inner end of capillary bore 13 may be stepped.

Metal bulb 12 may be formed such as by deformation of a flat sheet to define a cup-shaped element having an upper open end 18 adapted to have fitted engagement with the lower end 17 of the capillary element. As the capillary bore 13 is open to atmosphere, it is unnecessary to provide additional sealing means for sealing the bulb end 18 to the capillary element as no substantial pressure is built up in the liquid during the expansion and contraction thereof as a function of temperature change. The use of the metal bulb 12 provides an improved thermal transfer of heat to the liquid indicator 19 within the bulb and extending upwardly into the capillary bore 13 to provide an improved fast reading, such as of a patient's temperature. Thus, thermometer 10 defines an improved low cost clinical thermometer such as for use in hospitals and the like wherein cross infection may be avoided by the one-time use of the thermometer. Thus, in the illustrated embodiment, the capillary element 11 is provided with a suitable scale 20 for use as a clinical thermometer wherein the range of temperature indicated is from 94° to 108° Fahrenheit.

The capillary bore 13 and reservoir chamber 16 are dimensioned suitably so as to assure that the indicator liquid 19 remains at least partially in the low end of the bore portion 15 at the minimum expected ambient temperature which, illustratively, may be preselected as −40° F. to effectively preclude introduction of bubbles, etc. into the liquid indicator. The length of the capillary element is further preselected to provide an upper end portion 21 extending beyond the uppermost reading position suitably to prevent expansion of the liquid indicator to the distal end of the capillary bore within a preselected maximum expected ambient temperature, such as 140° F. Thus, while the bore is open to atmosphere through the open end 14, the thermometer is arranged to effectively avoid loss of the indicator liquid.

Thermometer 10 is extremely simple and economical of construction. Illustratively, the capillary element 11 may be molded of a low cost plastic, such as polystyrene, and the bulb element 12 may be formed of any suitable formable metal, such as aluminum. Illustratively, the bulb may have a wall thickness of approximately 0.012 inch with an outer diameter of approximately 1.88 inches and an overall length of approximately 1.182 inches. The capillary bore may have a diameter of approximately 0.009 inch adjacent the scale 20 with the distal end 14 thereof being reduced substantially from this cross-section to approximately 0.001 inch or less.

Indicator liquid 19 is exposed to atmosphere and, thus, is preferably a fluid which is substantially nonwettable with a low hygroscopicity. The liquid should be resistant to oxidation by being subjected to normal ambient atmosphere. The liquid should further have low volatility while yet possessing a relatively high coefficient of expansion suitable for use as a thermometer liquid indicator. The liquid is preferably dyeable for facilitated reading of the thermometer. The liquid should have a low compressibility, that is, one which is clinically insignificant within the range of high and low ambient pressures normally to be encountered in the use of the thermometer. The liquid should be stable to gas absorption and should be compatible with the plastic material of capillary element 11 and metal of bulb element 12. While other suitable liquids may be utilized within the scope of the invention, an excellent example of an indicator liquid having these desirable characteristics is that of the glycol compounds comprising glycol phenyl ethers. Ethylene glycol phenyl ether and propylene glycol phenyl ether have been found to be excellent indicator liquids of use in thermometer 10. Thus, the thermometer liquid may have a boiling point of approximately 245° C. with a surface tension of approximately 40 dynes per centimeter and a viscosity of at least approximately 20 centistokes at 25° C. The disclosed liquid indicators do not tend to become dirty as does mineral oil when used in such an open-to-atmosphere thermometer. The liquid further should be clinically non-toxic where the thermometer 10 is adapted for use as a clinical thermometer.

Thermometer 10 may be sterilized by the manufacturer, avoiding the necessity for sterilization techniques in the hospital or patient treatment area. The thermometer may be packaged in a suitable package generally designated 22 for sealing the thermometer in a maintained sterile condition.

The small opening 14 at the distal end of the capillary bore effectively precludes loss of liquid from the thermometer notwithstanding storage of the thermometer in an upside down position. Further, by virtue of the substantial extension of the upper end portion 21, the level of the liquid indicator in capillary bore 13 is effectively maintained within the outer end 14 for all normal expected temperatures to which the thermometer is subjected in transport and storage. Should, however, an abnormal condition obtain such that the temperature to which the thermometer is subjected is sufficient to cause the liquid indicator level to reach and pass the bore end 14, a portion of the liquid will be expelled from the thermometer and, thus, when the thermometer is again brought to normal ambient temperature, a false reading would be obtained as a result of the depletion of the indicator liquid. To warn the user against such a condition, the packaging material 22 is preferably made to be transparent at least at the portion 23 thereof adjacent the outer end 14 of the capillary bore. Thus, should any liquid pass outwardly from the thermometer, the liquid will stain the packaging portion 23 and provide positive indication of the abnormal condition thereby advising the user to discard the thermometer as defective. Thus, the indicating means discussed above provides a functioning similar to that of the bursting of the conventional glass thermometer when such is heated to an abnormally high temperature. The indicating means of the present invention, however, provides a safe means as no explosive, or shock action is involved.

In lieu of providing a separate package for each thermometer, the thermometers may be provided with small indicator means affixed thereto, such as the indicator element 24 illustrated in FIG. 5, comprising a small piece of transparent material such as plastic, secured to the outer end 21 of the capillary element such as by adhesive means 25 with a mid-portion 26 thereof extending across the outer opening 14 of the capillary bore. Any passing of liquid outwardly through the capillary bore opening 14 is thereby indicated as a result of the staining of the indicator portion 26. In normal use, the user merely peels off the indicator element 24 when the thermometer is to be used exposing the capillary bore freely to ambient atmosphere. The specific indicator elements discussed above are illustrative of the concept of providing means to be acted on by indicator liquid which may be undesirably expelled from the thermometer for any reason, thereby warning the user of the defective condition of the thermometer.

Thus, thermometer 10 is extremely simple and economical of construction permitting its use as a one-time thermometer or as a thermometer for repeated use with a single patient avoiding the necessity for sterilization required of conventional glass thermometers. The use of the metal bulb provides an accelerated reading of the patient's temperature by virtue of the improved heat transfer to the liquid indicator. As hermetic seals are eliminated in the thermometer construction, facilitated assembly and further cost savings are obtained.

The foregoing disclosure of specific embodiments is illustrative of the broad invention concepts comprehended by the invention.

I claim:

1. A low cost disposable clinical thermometer structure comprising: a molded plastic capillary element having a through capillary bore defining an open outer end defining a capillary opening and an open inner end; bulb means extending from the capillary element defining a reservoir chamber communicating with said capillary bore inner end; scale means on said capillary element; an expandable liquid indicator in said reservoir chamber and extending upwardly therefrom into said capillary bore, said capillary opening effectively precluding passage of indicator liquid outwardly therethrough other than as a result of expansion of the liquid; and means for indicating a defective condition of the thermometer resulting from a loss of a portion of the liquid indicator by a passing thereof out through said capillary opening notwithstanding evaporation of the passed liquid.

2. The thermometer structure of claim 1 wherein said means for indicating said defective condition comprises means at said capillary opening for retaining at least a portion of the liquid indicator passed outwardly through said capillary opening.

3. The thermometer structure of claim 1 wherein said means for indicating said defective condition comprises means packaging at least the outer end of the capillary element responsive to passage of said liquid indicator portion outwardly from said capillary opening to retain said liquid portion for subsequent observation by a user.

4. The thermometer structure of claim 1 wherein said means for indicating said defective condition comprises means packaging the entire thermometer.

5. A low cost disposable clinical thermometer structure comprising: a molded plastic capillary element having a through bore defining an open outer end and an open inner end; bulb means joined to the capillary element defining a reservoir chamber communicating with said capillary bore inner end; an expandable liquid indicator in said reservoir chamber and extending upwardly therefrom into said capillary bore; and means for indicating an abnormal condition wherein the liquid indicator has expanded to have a portion thereof pass out through said capillary bore open outer end defined by means secured to the capillary element and having a portion extending about the distal end of the capillary element across said bore outer end.

6. A thermometer structure comprising: a capillary element having a through bore defining an open outer end and an open inner end; a bulb element extending from said capillary element and defining a reservoir chamber in communication with said capillary bore inner end; thermally expandable liquid indicator filling said reservoir chamber and defining a column extending into said capillary bore through said inner end, said outer open end of the capillary bore having a small capillary cross-section preselected to preclude flow of said liquid indicator outwardly therethrough irrespective of the position of said capillary element as long as the thermally expanded volume of the liquid indicator incompletely fills and reservoir chamber and capillary bore for providing a variable disposition of the end of the column of the liquid indicator in said capillary element bore as a function of the temperature thereof, whereby the end of the column of the liquid indicator in said bore is effectively maintained at atmospheric pressure through said capillary cross-section outer end of the bore; and scale means on the capillary element for providing a temperature reading as a function of the position of said end of the liquid indicator column in said bore, said indicator liquid comprising a liquid having a low hygroscopicity of no more than approximately that of ethylene glycol phenyl ether.

7. The thermometer structure of claim 6 wherein said liquid indicator comprises a liquid which does not wet the capillary element.

8. The thermometer structure of claim 6 wherein said liquid indicator has a volatility of no more than approximately that of ethylene glycol phenyl ether.

9. A thermometer structure comprising: a capillary element having a through bore defining an open outer end and an open inner end; a bulb element extending from said capillary element and defining a reservoir chamber in communication with said capillary bore inner end; thermally expendable liquid indicator filling said reservoir chamber and defining a column extending into said capillary bore through said inner end, said outer open end of the capillary bore having a small capillary cross-section preselected to preclude flow of said liquid indicator outwardly therethrough irrespective of the position of said capillary element as long as the thermally expanded volume of the liquid indicator incompletely fills said reservoir chamber and capillary bore for providing a variable disposition of the end of the column of the liquid indicator in said capillary element bore as a function of the temperature thereof, whereby the end of the column of the liquid indicator in said bore is effectively maintained at atmospheric pressure through said capillary cross-section outer end of the bore; and scale means on the capillary element for providing a temperature reading as a function of the position of said end of the liquid indicator column in said bore, said outer end of the capillary bore having a cross-section smaller than that of the capillary bore inwardly of said outer end.

10. The thermometer structure of claim 9 wherein said outer open end of the capillary bore has a diameter of less than approximately one-tenth that of the capillary bore inwardly thereof.

11. The thermometer structure of claim 9 wherein the diameter of said outer open end of the capillary bore is approximately 0.0010 inch.

12. The thermometer structure of claim 9 wherein said liquid indicator has a surface tension of at least approximately 40 dynes/centimeter.

13. The thermometer structure of claim 9 wherein said bore outer end has a cross-section smaller than that of the bore at said scale means.

14. A thermometer structure comprising: a capillary element formed of molded plastic having a through bore defining an open outer end and an open inner end; a bulb element extending from said capillary element and defining a reservoir chamber in communication with said capillary bore inner end; thermally expandable liquid indicator filling said reservoir chamber and defining a column extending into said capillary bore through said inner end, said outer open end of the capillary bore having a small capillary cross-section preselected to preclude flow of said liquid indicator outwardly therethrough irrespective of the position of said capillary element as long as the thermally expanded volume of the liquid indicator incompletely fills said reservoir chamber and capillary bore for providing a variable disposition of the end of the column of the liquid indicator in said capillary element bore as a function of the temperature thereof, whereby the end of the column of the liquid indicator in said bore is effectively maintained at atmospheric pressure through said capillary cross-section outer end of the bore; and scale means on the capillary element for providing a temperature reading as a function of the position of said end of the liquid indicator column in said bore.

15. The thermometer structure of claim 14 wherein said bulb is formed of metal.

16. The thermometer structure of claim 14 wherein said liquid indicator comprises a substantially nonwetting liquid.

17. The thermometer structure of claim 14 wherein said liquid indicator comprises a liquid which is not oxidized by being subjected to normal ambient atmosphere.

18. The thermometer structure of claim 14 wherein said liquid indicator comprises a phenyl ether compound.

19. The thermometer structure of claim 14 wherein said liquid indicator comprises a glycol phenyl ether.

20. The thermometer structure of claim 14 wherein said liquid indicator comprises an ethylene glycol phenyl ether.

21. The thermometer structure of claim 14 wherein said liquid indicator comprises a propylene glycol phenyl ether.

22. The thermometer structure of claim 14 wherein said liquid indicator has a boiling point of approximately 245° C.

23. The thermometer structure of claim 14 wherein said liquid indicator has a surface tension of approximately 40 dynes/cm.

24. The thermometer structure of claim 14 wherein said liquid indicator has a viscosity of at least approximately 20 centistokes at 25° C.

25. The thermometer structure of claim 14 wherein said liquid indicator has a stable air absorption characteristic.

26. The thermometer structure of claim 14 wherein said liquid indicator has low volatility at normal ambient temperatures.

* * * * *